United States Patent [19]

Towfiq

[11] Patent Number: 5,895,013
[45] Date of Patent: Apr. 20, 1999

[54] LOW FREQUENCY NOISE SUPPRESSION SYSTEM

[75] Inventor: Foad Towfiq, Oceanside, Calif.

[73] Assignee: McDonnell Douglas Corp.

[21] Appl. No.: 08/723,616

[22] Filed: Oct. 2, 1996

[51] Int. Cl.⁶ .................................................. B64C 1/00
[52] U.S. Cl. .................... 244/119; 244/1 N; 244/133; 181/208; 181/290; 428/98; 428/192
[58] Field of Search ........................ 244/114, 1 N, 244/133, 110.5; 428/98, 101, 192, 71, 463; 181/208, 209, 290, 294, 291

[56] References Cited

U.S. PATENT DOCUMENTS

| | | |
|---|---|---|
| 2,581,625 | 1/1952 | Brady ................... 244/129.1 |
| 2,819,032 | 10/1958 | Detrie et al. . |
| 3,071,217 | 1/1963 | Gould . |
| 3,079,277 | 2/1963 | Painter ................... 181/291 |
| 3,087,568 | 4/1963 | Kurtze . |
| 3,160,549 | 12/1964 | Caldwell et al. . |
| 3,399,103 | 8/1968 | Salyer et al. . |
| 3,698,993 | 10/1972 | Rauh . |
| 4,416,349 | 11/1983 | Jacobs ................... 181/290 |
| 4,512,616 | 4/1985 | Suzuki et al. . |
| 4,635,882 | 1/1987 | SenGupta et al. . |
| 5,154,953 | 10/1992 | de Moncuit et al. . |
| 5,400,296 | 3/1995 | Cushman et al. . |
| 5,472,760 | 12/1995 | Norvell . |

*Primary Examiner*—Charles T. Jordan
*Assistant Examiner*—Tier Dinh
*Attorney, Agent, or Firm*—Donald E. Stout

[57] ABSTRACT

A constrained damping layer assembly includes a first constraining layer adapted for being secured to a first portion of an aircraft frame, and a second constraining layer adapted for being secured to a second portion of the aircraft frame. A damping material is sandwiched between the first constraining layer and the second constraining layer. The damping material includes a first side, which is adapted for slidably contacting the first constraining layer, and further includes a second side, which is adapted for slidably contacting the second constraining layer. The first constraining layer is adapted for sliding in a first direction upon introduction of a sheer load onto the interior panel, and the second constraining layer is adapted for sliding in a second direction upon introduction of a sheer load onto the interior panel.

26 Claims, 1 Drawing Sheet

LOW FREQUENCY NOISE SUPPRESSION SYSTEM

BACKGROUND OF THE INVENTION

1. Field of The Invention

The present invention relates generally to panels used in connection with aircraft and, more particularly, to interior panels for reducing low-frequency noise.

2. Description of Related Art

A typical aircraft has a continuous diaphragm construction, which comprises a number of individual skin panels. The skin panels are secured to a frame of the aircraft and provide, among other things, an aerodynamic surface for the aircraft. As the aircraft travels through the atmosphere, a turbulence of air is generated around the skin panels. This air turbulence can set the skin panels into vibration. The skin panels often vibrate in several modes with a significant sheer wave (analogous to the shaking of a rope). A vibrating skin panel can often act as an efficient loud speaker, radiating sound to the interior panels and into the cabin of the aircraft.

Energy from the vibrating skin panels can also be transferred into the aircraft frame and, subsequently, to the interior panels of the aircraft, setting them into vibration. The vibrating interior panels can also act as loudspeakers, generating sound which is transferred into the cabin. Energy from the vibrating skin panels can also be transferred to the interior panels through the space between the skin panels and the interior panels. Thus, although the skin panels can be somewhat effective in blocking sounds generated outside of the aircraft from the interior cabin, these skin panels can transmit air turbulence sounds to the interior panels.

A typical interior panel of an aircraft may include a trim or sidewall panel, a ceiling panel, a luggage rack side wall, a lavatory side wall, a galley side wall, or a floor panel. Prior art interior panels may comprise an aluminum base with a plastic coating or, alternatively, may comprise a honeycomb composite. The honeycomb composite may comprise two fiberglass layers separated by a light layer of paper material, for example. These interior panels are typically secured to the frame of the aircraft.

Another source of sound, which can be transmitted to the interior panels, is generated primarily by engine vibrations. These engine vibrations are transmitted to the frame of the aircraft and, subsequently, transmitted to the interior panels.

A typical prior art solution for attenuating the radiation of sound, from air turbulence and engine vibrations, into the cabin of the aircraft utilizes insulation blankets, placed into an air space between the skin panels and the interior panels. These insulation blankets may comprise fiberglass wool, for example. Sound from the skin panels is transferred in a direction toward the cabin through the "pumping" of air back and forth through the absorbent layers of the insulation blankets. This pumping of air through the absorbent materials of the insulation blankets results in an attenuation of the sound energy.

Since the insulation blankets are also set into oscillation by the wave front, and since the amount of energy required to sustain this oscillating motion is proportional to the square of frequency (kinetic energy is proportional to the square of velocity), insulation blankets can be somewhat effective in insulating higher frequency sounds. Lower frequency sounds, however, are not effectively attenuated by these prior art insulation blankets. For example, the low frequency engine tones in the rear portion of a typical aircraft cannot be effectively reduced by these insulation blankets.

In addition to not significantly attenuating low frequency sounds, prior art insulation blankets have other shortcomings. For example, fuselage insulation blankets often become wet during normal flight operation, as a result of aircraft operating conditions. In addition to increasing the overall weight of the aircraft, these wet insulation blankets have introduced corrosion into the aircraft. Additionally, in some instances, airlines have experienced passenger and service door malfunctions, due to frozen insulation blankets in the door. Further, the installation of these insulation blankets between the skin panels and the interior panels can be time consuming and expensive, not to mention the costs associated with maintenance and replacement of these insulation blankets. A need has existed in the prior art for a simple structure of providing adequate sound attenuation. This structure should significantly attenuate both high and low frequency sounds, and should be capable of providing thermal insulation capabilities as well.

SUMMARY OF THE INVENTION

The low-frequency noise suppression system of the present invention is simple in structure, and is effective in attenuating both high and low frequency sounds. A constrained damping layer assembly, according to the present invention, can be installed into an existing aircraft with relative ease, since the constrained damping layer assembly can be either integrated with the interior panel or added onto an existing interior panel.

The constrained damping layer assembly of the present invention includes a first constraining layer adapted for being secured to a first portion of an aircraft frame, and a second constraining layer adapted for being secured to a second portion of the aircraft frame. A damping material is sandwiched between the first constraining layer and the second constraining layer. The damping material includes a first planer side, which is adapted for slidably contacting the first constraining layer, and further includes a second planer side, which is adapted for slidably contacting the second constraining layer.

The first constraining layer is adapted for being secured to the first portion of the aircraft frame at a first attachment area on the first constraining layer, and the second constraining layer is adapted for being secured to the second portion of the aircraft frame at a second attachment area on the second constraining layer. When the damping material is sandwiched between the first constraining layer and the second constraining layer, the first attachment area is located near the first end of the damping material, and the second attachment area is located near the second end of the damping material. The first constraining layer is adapted for sliding in a direction from the second end to the first end, upon introduction of a sheer load onto the interior panel, and the second constraining layer is adapted for sliding in a direction from the first end to the second end, upon introduction of a sheer load onto the interior panel.

The damping material may include a viscoelastic material or a viscous fluid substance. The constrained damping layer assembly can be configured in place of, or in addition to, a trim or sidewall panel, a ceiling panel, a luggage rack sidewall, a lavatory sidewall, a galley sidewall, or a floor panel.

According to another aspect of the present invention, an interior panel for use on an aircraft includes a plurality of constraining layers and a damping material, which is adapted for being sandwiched between the plurality of constraining layers. The plurality of constraining layers may comprise two constraining layers, with each of the two constraining layers being adapted for being secured to a frame of the aircraft. The damping material may comprise a sheet form, a liquid form, or a tape form. Further, the damping material may comprise a viscoelastic substance. The viscoelastic substance may comprise a granular material added thereto, for increasing an internal friction of the damping material. The damping material may further comprise a thermal insulation characteristic.

According to yet another aspect of the present invention, the first constraining layer and the second constraining layer generally sandwiches a viscous fluid. The viscous fluid is sufficiently viscous to be effective at damping low frequencies. When a panel or constrained layer is set into vibration, a cyclic shear stress is produced at the interfaces of the constraining layers and the viscous fluid layer. This shearing action at various regions of the interface causes microscopic slipage of adjacent points on both interfaces. As a result, the mechanical energy of the vibration is converted into heat energy and damping occurs. The slipped regions are generally local and do not extend over the entire surface.

According to yet another aspect of the present invention, the plurality of constraining layers comprises four constraining layers. A first two of the four constraining layers encloses a first layer of damping material, the first two constraining layers and the first layer of damping material comprising a first constrained damping layer. A second two of the four constraining layers encloses a second layer of damping material, the second two constraining layers and the second layer of damping material comprising a second constrained damping layer. A light material with a low thermal conductivity, such as aerogels, is sandwiched between the first constrained damping layer and the second constrained damping layer. Each of the plurality of constraining layers may comprise either an aluminum and plastic combination, or a honeycomb composite.

DETAILED DESCRIPTION OF THE PRESENTLY PREFERRED EMBODIMENTS

Figure 1:
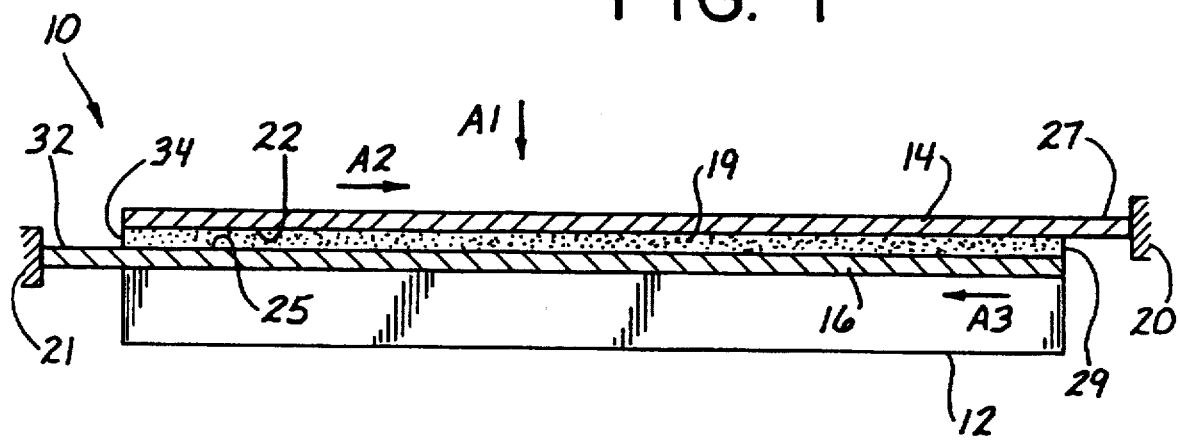
FIG. 1 illustrates an embodiment of a low-frequency noise suppression system according to the present invention.

Turning to FIG. 1, a low-frequency noise suppression system 10 of the presently preferred embodiment is illustrated, secured to an interior panel 12. The low frequency noise suppression system 10 of the presently preferred embodiment comprises a first constraining layer 14 and a second constraining layer 16. As embodied herein, the first constraining layer 14 and the second constraining layer 16 comprise a honeycomb composite. This honeycomb composite may comprise two layers of fiberglass and resin, separated by a light layer of paper or paperlike material, for example. Alternatively, each of the first constraining layer 14 and the second constraining layer 16 may comprise an aluminum base with a plastic coating. Both the honeycomb composite configuration and the aluminum base and plastic coating configuration have common structural properties suitable for fabrication of the first constraining layer 14 and the second constraining layer 16.

A damping material 19 is disposed between the first constraining layer 14 and the second constraining layer 16. As presently embodied, the damping material 19 comprises a viscoelastic substance or alternatively, a viscous fluid substance. The viscoelastic substance, viscous fluid substance, or similar damping substances, either alone or in combination, may be loaded with granular materials to increase an internal friction of the damping layer 19. In the presently preferred embodiment, the second constraining layer 16 is secured to the interior panel 12 using conventional means. Alternatively, the interior panel 12 may be integrally formed with the second constraining layer 16. As another alternative, the interior panel 12 may comprise only the first constraining layer 14, the second constraining layer 16, and the damping material 19.

In the presently preferred embodiment, the first constraining layer 14 is secured to a first portion 20 of a frame of an aircraft, and the second constraining layer 16 is secured to a second portion 21 of the aircraft frame. The damping material 19 comprises a first planar side 22 and a second planar side 25 for slidably contacting the first constraining layer 14 and the second constraining layer 16, respectively. The first constraining layer 14 is secured to the aircraft frame at a first attachment area 27, which is located near a first end 29 of the damping material 19. Similarly, the second attachment area 32 is secured to the second portion of the aircraft frame near a second end 34 of the damping material 19.

The combination of a damping material 19, having a first planar side 22 for slidably contacting a first constraining layer 14, and having a second planar side 25 for slidably contacting a second constraining layer 16, provides an efficient means of low-frequency sound reduction. The damping material 19 is provided with intrinsic vibration energy absorbing properties, but the freedom of movement of the first constraining layer 14 and the second constraining layer 16, relative to the damping layer 19, provides a further means of energy absorption and noise reduction. This further means of noise reduction is particularly suited for attenuating low-frequency noises.

When sound energy is transmitted to the interior panels, the panels are set into vibration. Both the first constraining layer 14 and the second constraining layer 16, go through a cyclic deflection. The cyclic deflection applies a cyclic shear stress on the damping layer 19. If the damping layer is a viscoelastic material, because of the relative movement of the constraining layers 14 and 16, it distorts significantly in shear and dissipate energy. If the damping layer 19 is a viscous fluid, it allows the constraining layers 14 and 16 to slip relative to each other and convert mechanical energy to heat. Thus, the system 10 of the present invention, dissipates vibration energy more efficiently in general and effectively damps low frequency vibrations as well.

The initial deflection of either the first constraining layer 14 or the second constraining layer 16, or both, in response to sound energy, attenuates the sound energy. Since neither the first constraining layer 14 nor the second constraining layer 16 is directly secured to the damping layer 19, deflection of either the first constraining layer 14 or the second constraining layer 16 results in subsequent sliding of the respective layer on the damping material 19. For example, sound energy traveling in the direction of arrow A1 will initially deflect and bend the first constraining layer 14 in the same direction. Since the first constraining layer 14 is attached to the aircraft frame at the first attachment area 27, deflection of this first constraining layer 14 in the direction of the arrow A1 results in the first constraining layer 14 sliding in the direction of the arrow A2, relative to the damping material 19. Friction is generated as the first constraining layer 14 slides over the damping material 19, and this friction serves to dissipate the sound energy as heat.

Sound energy radiating onto the second constraining layer 16 in the direction of the arrow A1, for example, initially deflects and bends the second constraining layer 16 in the that same direction. Since the second constraining layer 16 is attached at the second attachment area 32, deflection of the second constraining layer 16 in the direction of the arrow A1 results in movement of the second constraining layer 16 in the direction of the arrow A3, relative to the damping material 19. This relative movement of the second constraining layer 16 and the damping material 19 results in a transformation of the impinging sound energy into heat.

Figure 2:
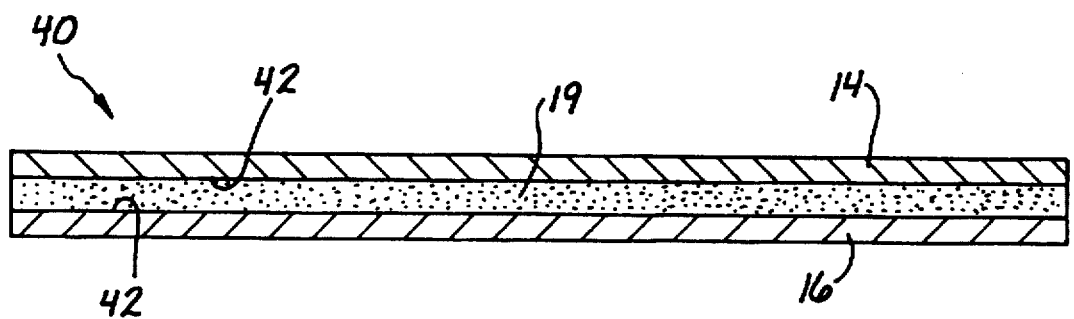
FIG. 2 illustrates an alternative embodiment of a low-frequency noise suppression system according to the present invention.

Turning now to FIG. 2, an alternative embodiment of a low frequency noise suppression system 40, having the features of the present invention is illustrated. The low frequency noise suppression system 40 generally comprises a first constraining layer 14 and a second constraining layer 16. A damping material 19 is disposed between the first constraining layer 14 and the second constraining layer 16. As previously described, the first constraining layer 14 and the second constraining layer 16 may comprise a honeycomb or other spaced apart composite. Specifically, the honeycomb composite may comprise two layers of fiber glass resin, separated with a layer of paper or paperlike material. Alternatively, the first constraining layer 14 and the second constraining layer 16 may comprise an aluminum sheet with a plastic coating or any other rigid material suitable as a constraining layer. The damping material 19 may comprise a viscous fluid with high degree of viscoelasticity. However, the damping material 19 may also comprise viscoelastic substance. The first constraining layer 14 and the second constraining layer 16 may be clamped together.

According to yet another aspect of the present invention, the first constraining layer 14 and the second constraining layer 16 generally sandwiches a viscous fluid 19. The viscous fluid 19 is sufficiently viscous to be effective at damping low frequencies. When a panel or constrained layer is set into vibration, a cyclic shear stress is produced at each of the interfaces 42 between the constraining layers 14 and 16 and the viscous fluid layer 19. This shearing action at various regions on the interfaces 42 causes microscopic slipage of adjacent points at both of the interfaces 42. As a result, the mechanical energy of the vibration is converted into heat energy and damping occurs. The slipped regions are generally local and do not extend over the entire surface. Viscous fluid damping materials suitable for this application may generally be low molecular weight polymers. For example, short chain polymers such as "telomer" or Oligomer" which are viscous fluids with high degree of viscoelasticity. More specific examples of viscous fluid damping materials may include silicon rubber oligomers and hydrosyl-terminatred butadiene/acrylonitrile co-polymer. Alternatively, a carboxyl-terminated butadiene/acrylontrile co-polymer, such as "Hycar" manufactured by B.F. Goodrich.

When the noise suppression system 40 is set into vibration, a cyclic load is applied to the first constraining layer 14 and the second constraining layer 16, which produces a cyclic shear stress in the damping material 19. As the load varies in each cycle of vibration, the resulting shearing action at various locations on the interface 42 exceeds the limiting value permitted by the friction characteristics of the damping material 19 and the constraining layers 14 and 16. In these regions, microscopic slipage of adjacent points occurs at both of the interfaces 42. As a result, the mechanical energy of the vibration is dissipated into heat energy and damping occurs. This damping is effective in dissipating energy at low frequencies.

The low-frequency noise suppression system 10 of the present invention may be used in place of the insulation blankets of the prior art. In order to provide additional thermal insulation properties, a lightweight material with a low thermal conductivity may be added to the low-frequency noise suppression system 10. In one embodiment, a third constraining layer and a fourth constraining layer, similar to the first constraining layer 14 and the second constraining layer 16, respectively, may be provided with a damping material disposed therebetween. The first constraining layer 14, the second constraining layer 16, and the damping material 19 disposed therebetween will comprise a first constrained damping layer, and the third constraining layer, the fourth constraining layer, and the damping material disposed therebetween will comprise a second constrained damping layer.

The lightweight material having a low thermal conductivity may then be sandwiched between the first constrained damping layer and the second constrained damping layer. This configuration of the first constrained damping layer, the second constrained damping layer, and the lightweight material having a low thermal conductivity disposed therebetween, may comprise the entire interior panel, according to this alternative embodiment. Alternatively, this assembly may be secured to an existing internal panel. The lightweight material having a low thermal conductivity would preferably comprise aerogels. Aerogels is a very poor conductor of heat, and is a solid material having an extremely low density.

Another method to provide additional insulation is to attach a multi layer insulation on the face of one or both of the constraining layers 14 and 16. The multi layer insulations suitable for aircraft applications should not be flammable (for example multi layer aluminized mylar is generally not suitable) and may be made of several thin layers of glass fiber paper or tightly bonded cellulose glass fiber paper metalized on one side. Alternatively, the multi layer insulation may be made of several layers of glass fiber paper separated with aluminum or other metalized foils. The glass fiber layer may have a low thermal conductivity and the metalized surface reflects the radiative heat back, therefore providing a very efficient thermal insulation of the panels.

Other alternative embodiments are also possible within the scope of the present invention. For example, damping materials 19 may be added to interior panels in sheet form for adhesive application, in liquid form for spray application, or as tapes with contact adhesive already applied thereto. Although the present invention has been described in the particular context of aircraft applications, other applications, such as land or water vehicles, are also possible. In the case of aircraft applications, the damping materials may be designed to provide thermal insulation and corrosion resistance to thereby further facilitate the elimination of prior art insulation blankets. As another alternative embodiment, interior panels of aircrafts may be manufactured having at least one constrained damping layer.

Although exemplary embodiments of the invention have been shown and described, many other changes, modifications and substitutions, in addition to those set forth in the above paragraphs, may be made by one having ordinary skill in the art without necessarily departing from the spirit and scope of this invention.

What is claimed is:

1. An aircraft constrained damping layer assembly, comprising:
   a first constraining layer having a first attachment area and being secured at said first attachment area to only a first portion of an aircraft frame;

a second constraining layer having a second attachment area and being secured at said second attachment area to only a second portion of the aircraft frame; and a damping material sandwiched between the first constraining layer and the second constraining layer;

wherein the first and second attachment areas are spaced from one another in such a manner that the first and second constraining layers are independently attached to said first and second portions of the aircraft frame.

2. The aircraft constrained damping layer assembly as recited in claim 1, the damping material comprising a first side and a second side, the first constraining layer being adapted for slidably contacting the first side of the damping material, and the second constraining layer being adapted for slidably contacting the second side of the damping material.

3. The aircraft constrained damping layer assembly as recited in claim 2, the damping material further comprising a first end and a second end opposite the first end, the first attachment area being located near the first end, and the second attachment area being located near the second end.

4. The aircraft constrained damping layer assembly as recited in claim 3, the first constraining layer being adapted for sliding in a direction from the second end to the first end, upon introduction of a sheer load onto the constrained damping layer assembly.

5. The aircraft constrained damping layer assembly as recited in claim 4, the second constraining layer being adapted for sliding in a direction from the first end to the second end, upon introduction of a sheer load onto the constrained damping layer assembly.

6. The aircraft constrained damping layer assembly as recited in claim 1, the damping material comprising a viscoelastic substance.

7. The aircraft constrained damping layer assembly as recited in claim 1, the damping material comprising a viscous liquid.

8. The aircraft constrained damping layer assembly as recited in claim 7, wherein said damping material is capable of localized slipages against at least one of said constraining members for low frequency energy damping.

9. The aircraft constrained damping layer assembly as recited in claim 1, the constrained damping layer assembly being adapted for being secured to at least one of a sidewall panel, a ceiling panel, a luggage rack side wall, a lavatory side wall, a galley side wall, and a floor panel.

10. The aircraft constrained damping layer assembly as recited in claim 1, the constrained damping layer assembly being adapted for operating as at least one of a sidewall panel, a ceiling panel, a luggage rack side wall, a lavatory side wall, a galley side wall, and a floor panel.

11. The aircraft constrained damping layer assembly as recited in claim 1, wherein the damping material comprises a viscous fluid.

12. The aircraft constrained damping layer assembly as recited in claim 11, wherein the viscous fluid comprises a low molecular weight polymer.

13. The aircraft constrained damping layer assembly as recited in claim 12, wherein the viscous fluid comprises a short chain polymer.

14. The aircraft constrained damping layer assembly as recited in claim 13, wherein the viscous fluid comprises a telomer or ologomer.

15. The aircraft constrained damping layer assembly as recited in claim 12, wherein the viscous fluid comprises one of a silicon rubber ologomer, a hydrosyl-terminatred butadiene/acrylonitrile co-polymer, and a carboxyl-terminated butadiene/acrylontrile co-polymer.

16. An interior panel for use on an aircraft, comprising:

a plurality of constraining layers; and a damping material comprising a viscous fluid disposed between the plurality of constraining layers, wherein the viscous fluid comprises a low molecular weight polymer.

17. The interior panel as recited in claim 16, the plurality of constraining layers comprising two constraining layers, each of the two constraining layers being adapted for being secured to a frame of the aircraft.

18. The interior panel as recited in claim 17, a first one of the two constraining layers being adapted for being secured only to a first portion of the aircraft frame, and a second one of the two constraining layers being adapted for being independently secured only to a second portion of the aircraft frame.

19. The interior panel as recited in claim 16, the plurality of constraining layers comprising four constraining layers, each of the four constraining layers being adapted for being secured to a frame of the aircraft.

20. The interior panel as recited in claim 19, a first two of the four constraining layers sandwiching a first layer of damping material, the first two constraining layers and the first layer of damping material comprising a first constrained damping layer, and a second two of the four constraining layers sandwiching a second layer of damping material, the second two constraining layers and the second layer of damping material comprising a second constrained damping layer.

21. The interior panel as recited in claim 16, each of the plurality of constraining layers being made entirely or in part of (1) an aluminum and plastic combination and (2) a honeycomb composite.

22. The interior panel as recited in claim 16, the interior panel being adapted for being secured to at least one of a sidewall panel, a ceiling panel, a luggage rack side wall, a lavatory side wall, a galley side wall, and a floor panel.

23. The interior panel as recited in claim 16, the interior panel being adapted for operating as at least one of a trim panel, a ceiling panel, a luggage rack side wall, a lavatory side wall, a galley side wall, and a floor panel.

24. The interior panel as recited in claim 16, wherein the viscous fluid comprises a short chain polymer.

25. The aircraft constrained damping layer assembly as recited in claim 24, wherein the viscous fluid comprises a telomer or ologomer.

26. The aircraft constrained damping layer assembly as recited in claim 16, wherein the viscous fluid comprises one of a silicon rubber ologomer, a hydrosyl-terminatred butadiene/acrylonitrile co-polymer, and a carboxyl-terminated butadiene/acrylontrile co-polymer.

* * * * *